United States Patent
Lee et al.

(10) Patent No.: US 11,676,334 B2
(45) Date of Patent: Jun. 13, 2023

(54) METHOD AND APPARATUS FOR PLENOPTIC POINT CLOUDS GENERATION

(71) Applicants: Electronics and Telecommunications Research Institute, Daejeon (KR); HANDONG GLOBAL UNIVERCITY INDUSTRY-ACADEMIC COOPERATION FOUNDATION, Pohang-si Gyeongsangbuk-do (KR)

(72) Inventors: Ha Hyun Lee, Seoul (KR); Jung Won Kang, Daejeon (KR); Soo Woong Kim, Sejong-si (KR); Gun Bang, Daejeon (KR); Jin Ho Lee, Daejeon (KR); Sung Chang Lim, Daejeon (KR); Sung Soo Hwang, Pohang-si Gyeongsangbuk-do (KR); Se Hui Kang, Pohang-si Gyeongsangbuk-do (KR); Ji Won Moon, Pohang-si Gyeongsangbuk-do (KR); Mu Hyun Back, Gwangju (KR); Jin Kyu Lee, Cheongju-si Chungcheongbuk-do (KR); Hyun Min Han, Gwangju (KR)

(73) Assignees: Electronics and Telecommunications Research Institute, Daejeon (KR); HANDONG GLOBAL UNIVERCITY INDUSTRY-ACADEMIC COOPERATION FOUNDATION, Pohang-si Gyeongsangbuk-do (KR)

(*) Notice: Subject to any disclaimer, the term of this patent is extended or adjusted under 35 U.S.C. 154(b) by 0 days.

(21) Appl. No.: 17/111,234

(22) Filed: Dec. 3, 2020

(65) Prior Publication Data

US 2021/0217229 A1 Jul. 15, 2021

(30) Foreign Application Priority Data

Dec. 3, 2019 (KR) .................. 10-2019-0159213
Dec. 3, 2020 (KR) .................. 10-2020-0167133

(51) Int. Cl.
G06T 17/00 (2006.01)
G06T 7/50 (2017.01)
G06T 7/90 (2017.01)

(52) U.S. Cl.
CPC ............... *G06T 17/00* (2013.01); *G06T 7/50* (2017.01); *G06T 7/90* (2017.01)

(58) Field of Classification Search
None
See application file for complete search history.

(56) References Cited

U.S. PATENT DOCUMENTS

| 2008/0024493 A1* | 1/2008 | Bordoloi ................. G06T 15/08 |
| | | 345/423 |
| 2013/0230224 A1* | 9/2013 | Claude ................... A61B 5/055 |
| | | 382/131 |

(Continued)

FOREIGN PATENT DOCUMENTS

| KR | 1020190089115 A | 7/2019 |
| WO | 2019213450 A1 | 11/2019 |

OTHER PUBLICATIONS

Sandri, Gustavo, Ricardo De Queiroz, and Philip A. Chou. "Compression of plenoptic point clouds using the region-adaptive hierarchical transform." 2018 25th IEEE International Conference on Image Processing (ICIP). IEEE, 2018. (Year: 2018).*

Sandri, Gustavo, Ricardo L. de Queiroz, and Philip A. Chou. "Compression of plenoptic point clouds." IEEE Transactions on Image Processing 28.3 (2018): 1419-1427. (Year: 2018).*

(Continued)

*Primary Examiner* — Ryan McCulley
(74) *Attorney, Agent, or Firm* — William Park & Associates Ltd.

(57) ABSTRACT

The present invention relates to a plenoptic cloud generation method, the method of generating a plenoptic point cloud according to one embodiment of the present invention, the method comprises, obtaining a two-dimensional (2D) image for each view and depth information obtained from a plurality of cameras, determining a method of generating a (Continued)

plenoptic point cloud and generating the plenoptic point cloud by applying the determined method of generating the plenoptic point cloud to at least one of the 2D image for each view or the depth information, wherein the method of generating the plenoptic point cloud includes at least one of a simultaneous generation method of the point cloud and a sequential generation method of the point cloud.

19 Claims, 11 Drawing Sheets

(56) References Cited

U.S. PATENT DOCUMENTS

| | | | |
|---|---|---|---|
| 2019/0206016 A1* | 7/2019 | Romm | G06T 15/40 |
| 2020/0111237 A1* | 4/2020 | Tourapis | H04N 19/597 |
| 2021/0012538 A1* | 1/2021 | Wang | G06T 17/05 |
| 2021/0133929 A1* | 5/2021 | Ackerson | G06F 3/04815 |

OTHER PUBLICATIONS

Zhang, Xiang, et al. "Surface light field compression using a point cloud codec." IEEE Journal on Emerging and Selected Topics in Circuits and Systems 9.1 (2018): 163-176. (Year: 2018).*

Sandri, Gustavo, et al. "Point cloud compression incorporating region of interest coding." 2019 IEEE International Conference on Image Processing (ICIP). IEEE, 2019. (Year: 2019).*

Li Li et al., Video-based compression for plenoptic point clouds, Nov. 4, 2019.

* cited by examiner

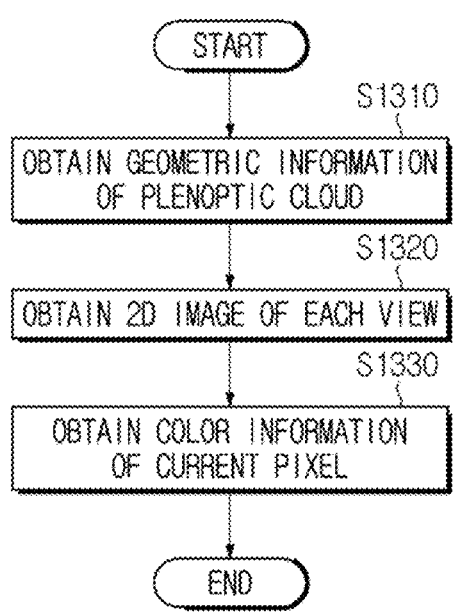

METHOD AND APPARATUS FOR PLENOPTIC POINT CLOUDS GENERATION

CROSS REFERENCE TO RELATED APPLICATION

The present application claims priority to Korean Patent Application Nos. filed and filed, the entire contents of which is incorporated herein for all purposes by this reference.

BACKGROUND OF THE INVENTION

1. Field of the Invention

The present invention relates to a method and apparatus for generating a plenoptic point cloud, and more particularly, to a method of representing a multi-view image.

2. Description of the Related Art

A plenoptic point cloud is a set of plenoptic points and means a representation method having one geometric information indicating the position of one three-dimensional point and a plurality of color information obtained from multi-view images.

In recent years, as interest in immersive content has explosively increased and broadcast equipment and image transmission technology have been developed, there is an increasing movement to actively use immersive content even in multimedia industry such as movies and TV. As a method of expressing immersive content, there is a method of utilizing multi-view plus depth (MVD) data. The MVD data refers to data obtained by obtaining an image of a specific view and depth information using a plurality of cameras disposed at short intervals. This is widely used as a raw material for expressing immersive content, because it is possible to perform modeling by geometric reconstruction and synthesis using not only the color and depth information of the image but also the camera position information of shooting views.

The MVD data is advantageous in that three-dimensional content with a high completion level can be created as the number of shooting views increases, but has a problem in transmission bandwidth because images need to be additionally transmitted during transmission. In addition, multi-view high-quality images require a larger storage space.

SUMMARY OF THE INVENTION

An object of the present invention is to provide a method and apparatus for generating a plenoptic point cloud.

Another object of the present invention is to provide a method and apparatus for representing a multi-view image with improved efficiency.

Another object of the present invention is to provide a recording medium storing a bitstream generated by a method and apparatus for generating a plenoptic point cloud.

BRIEF DESCRIPTION OF THE DRAWINGS

The above and other objects, features and other advantages of the present invention will be more clearly understood from the following detailed description taken in conjunction with the accompanying drawings, in which:

FIG. 13 is a view illustrating a method of generating a multi-view image according to an embodiment of the present disclosure.

DESCRIPTION OF THE PREFERRED EMBODIMENTS

Figure 1:
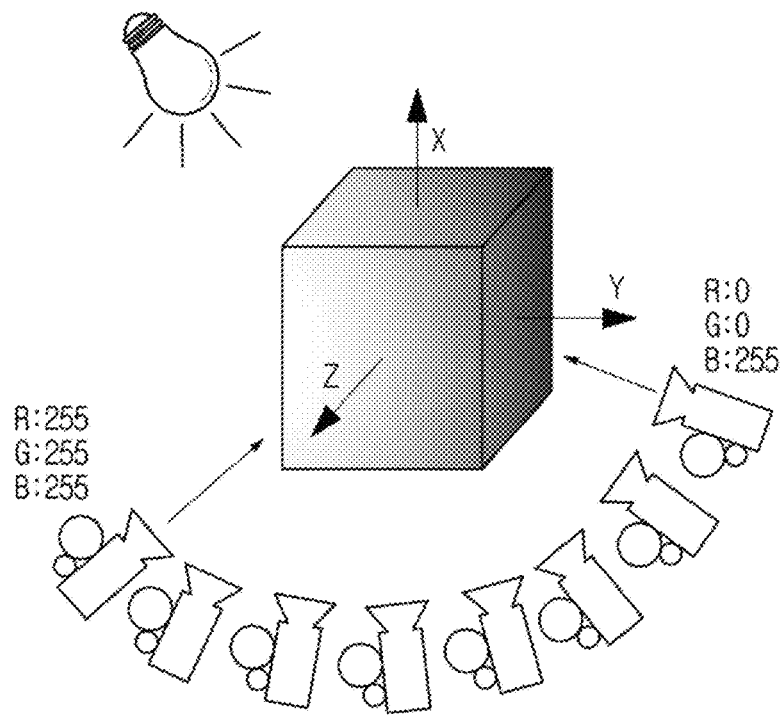
FIG. 1 is a view illustrating a system for generating a plenoptic point cloud.

A variety of modifications may be made to the present invention and there are various embodiments of the present invention, examples of which will now be provided with reference to drawings and described in detail. However, the present invention is not limited thereto, although the exemplary embodiments can be construed as including all modifications, equivalents, or substitutes in a technical concept and a technical scope of the present invention. The similar reference numerals refer to the same or similar functions in various aspects.

Terms used in the specification, "first", "second", etc. can be used to describe various components, but the components are not to be construed as being limited to the terms. The terms are only used to differentiate one component from other components. For example, the "first" component may be named the "second" component without departing from the scope of the present invention, and the "second" component may also be similarly named the "first" component. The term "and/or" includes a combination of a plurality of items or any one of a plurality of terms.

It will be understood that when an element is simply referred to as being "connected to" or "coupled to" another element without being "directly connected to" or "directly coupled to" another element in the present description, it may be "directly connected to" or "directly coupled to" another element or be connected to or coupled to another element, having the other element intervening therebetween. In contrast, it should be understood that when an element is referred to as being "directly coupled" or "directly connected" to another element, there are no intervening elements present.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added.

Hereinafter, embodiments of the present invention will be described in detail with reference to the accompanying drawings. The same constituent elements in the drawings are denoted by the same reference numerals, and a repeated description of the same elements will be omitted.

Hereinafter, a method and apparatus for generating a plenoptic point cloud will be described in detail with reference to FIGS. 1 to 13.

FIG. 1 is a view illustrating a system for generating a plenoptic point cloud.

When one object is viewed at multiple points of view, there may be a color difference even in the same object due to influences such as lighting. During actual shooting, most objects have reflecting surfaces because colors thereof may be changed according to the position of a light source. In addition, there may be overlapped image portions in multi-view images. Since an existing three-dimensional (3D) point has only one color information per point, it is difficult to reflect such characteristics. The present disclosure proposes an embodiment of using the concept of the plenoptic point in order to solve such a problem.

FIG. 1 shows an example of generating a plenoptic point cloud. As shown in FIG. 1, the plenoptic point may be represented by one or more geometric information represented in X, Y and Z coordinates and/or color information expressed by an RGB format in a three-dimensional space. In addition, the plenoptic point cloud may further include a variety of attribute information obtained when a point in a 3D space is observed using a plurality (e.g., natural number N) of cameras.

Figure 2:
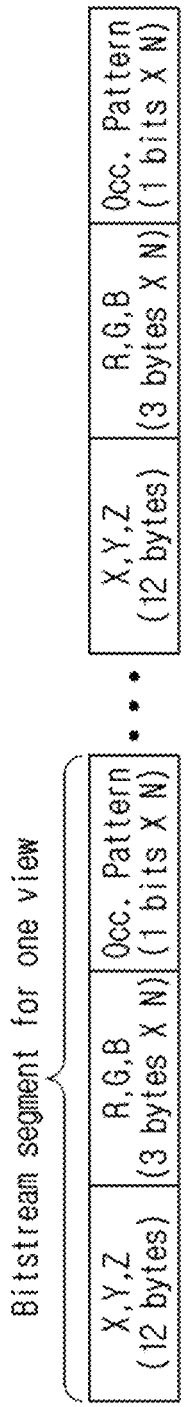
FIG. 2 is a view illustrating a bitstream allocation format for a plenoptic point cloud according to an embodiment of the present disclosure.

FIG. 2 is a view illustrating a bitstream allocation format for a plenoptic point cloud according to an embodiment of the present disclosure.

In the following description, a bitstream may mean a storage format represented by a binary sequence of 0 and 1. In addition, in the present disclosure, an allocation format may mean not only a bitstream based format but also a representation allocation format composed of arbitrary information. Although the bitstream will be focused upon as the allocation format in the following description, the scope of the present disclosure is not limited by such a representation.

For example, the bitstream allocation format or the representation allocation format for a plenoptic point cloud may be as shown in FIG. 2. When a 3D point is observed using a plurality of cameras, an object may be hidden by other objects and thus meaningless color information may be included. In the following description, occlusion pattern information may mean such information. In some embodiments of the present disclosure, a view including meaningless color information due to self-occlusion among color information may be inferred from the occlusion pattern information. The occlusion pattern information may be composed of "0" or "1". When the occlusion information indicates "1" which is a first value, the occlusion information may indicate that color information indicates meaningful information and, when the occlusion information indicates "0" which is a second value, the occlusion information may indicate that color information indicates meaningless color information.

Figure 3:
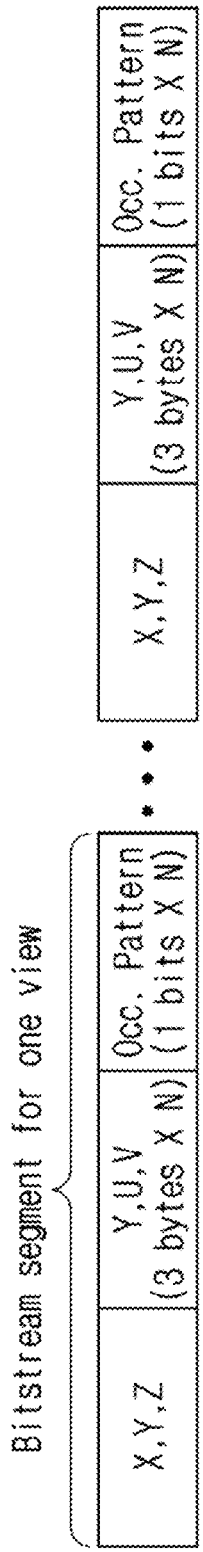
FIG. 3 is a view illustrating a bitstream allocation format for a plenoptic point cloud according to another embodiment of the present disclosure.

FIG. 3 is a view illustrating a bitstream allocation format for a plenoptic point cloud according to another embodiment of the present disclosure.

As another example, a bitstream allocation format or representation allocation format for a plenoptic point cloud may be as shown in FIG. 3. One view bitstream segment may include one geometric information related to (X, Y, Z), N color information and/or N occlusion pattern information. The N color information may be stored using various color formats such as an RGB format or a YUV format. In the following description, the scope of the present disclosure is not limited by the type of the proposed format.

Meanwhile, the YUV format may represent a color with three pieces of information such as luminance Y, a difference U between a luminance signal and a blue component and a difference V between the luminance signal and a red component. The Y component may be coded into more bits than the color components U and V. For example, YUV may be stored in a ratio of 4:2:2.

At this time, the geometric information may have a variable storage space according to voxelization resolution. For example, when geometric information is stored in a basic flat type, the geometric information may be stored as 4-byte information.

Figure 4:
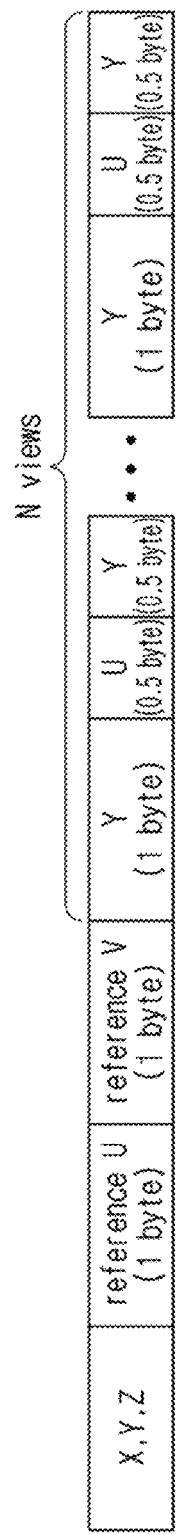
FIG. 4 is a view illustrating a bitstream allocation format for a plenoptic point cloud according to another embodiment of the present disclosure.

FIG. 4 is a view illustrating a bitstream allocation format for a plenoptic point cloud according to another embodiment of the present disclosure.

As another example, a bitstream allocation format or representation allocation format for a plenoptic point cloud may be as shown in FIG. 4. In the case of a YUV format, a color difference between U and V channels may not be large within one plenoptic point. At this time, the U and V color values may be represented by a difference value between one representative value and information obtained by another camera.

For example, the difference value at this time may be represented through an index as shown in Table 1 below. For example, when the difference value has a range from −7 to +7, the index may be represented using 4 bits. When the index is represented using 4 bits, an index value 15 having a largest value may be used to indicate occlusion pattern information.

TABLE 1

|  | 0 | ... | 7 | ... | 14 | 15 |
|---|---|---|---|---|---|---|
| difference value | −7 | ... | 0 | ... | 7 | Occlusion |

Meanwhile, a color value which is first set when generating a plenoptic point may be designated as the representative values of U and V. As another example, the color value of an N-th view may be designated as a representative value.

Figure 5:
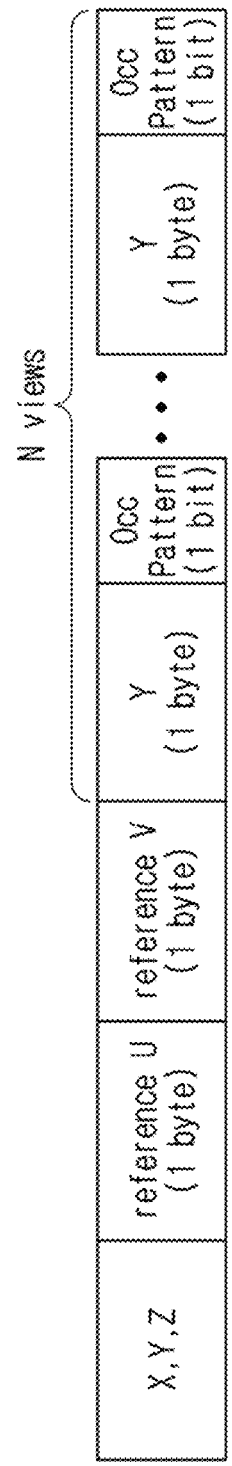
FIG. 5 is a view illustrating a bitstream allocation format for a plenoptic point cloud according to another embodiment of the present disclosure.

FIG. 5 is a view illustrating a bitstream allocation format for a plenoptic point cloud according to another embodiment of the present disclosure.

As another example, a bitstream allocation format or representation allocation format for a plenoptic point cloud may be as shown in FIG. 5. In the case of a YUV format, a color difference between U and V channels may not be large within one plenoptic point. At this time, since the amount of data occupied by the color value may be large, both the color values corresponding to U and V may be designated as a representative value.

At this time, the representative value may be designated as a color which is first set when generating a plenoptic point. As another example, the color value of an N-th view may be designated as a representative value.

Figure 6:
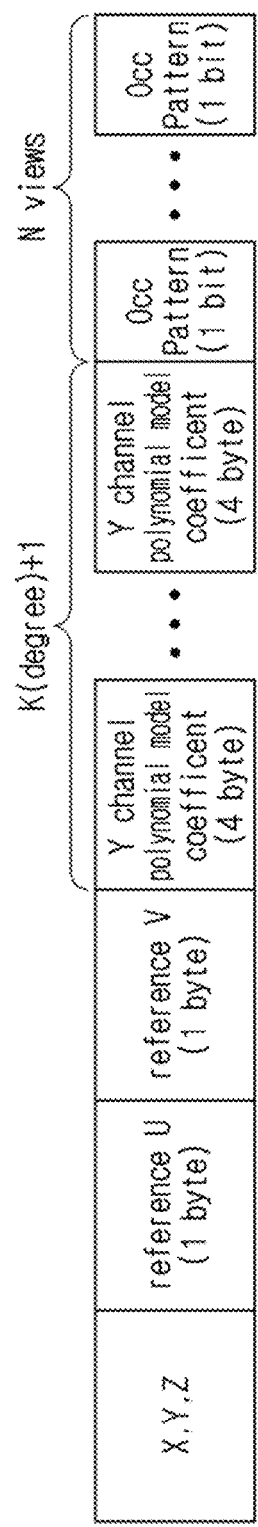
FIG. 6 is a view illustrating a bitstream allocation format for a plenoptic point cloud according to another embodiment of the present disclosure.

FIG. 6 is a view illustrating a bitstream allocation format for a plenoptic point cloud according to another embodiment of the present disclosure.

As another example, a bitstream allocation format or representation allocation format for a plenoptic point cloud may be as shown in FIG. 6. Referring to FIG. 6, a color value corresponding to a Y component may be modeled in the form of a polynominal expression and coefficients of the polynominal expression may be stored as data of the Y component.

Hereinafter, a method of generating a plenoptic point cloud will be described in detail.

Figure 7:
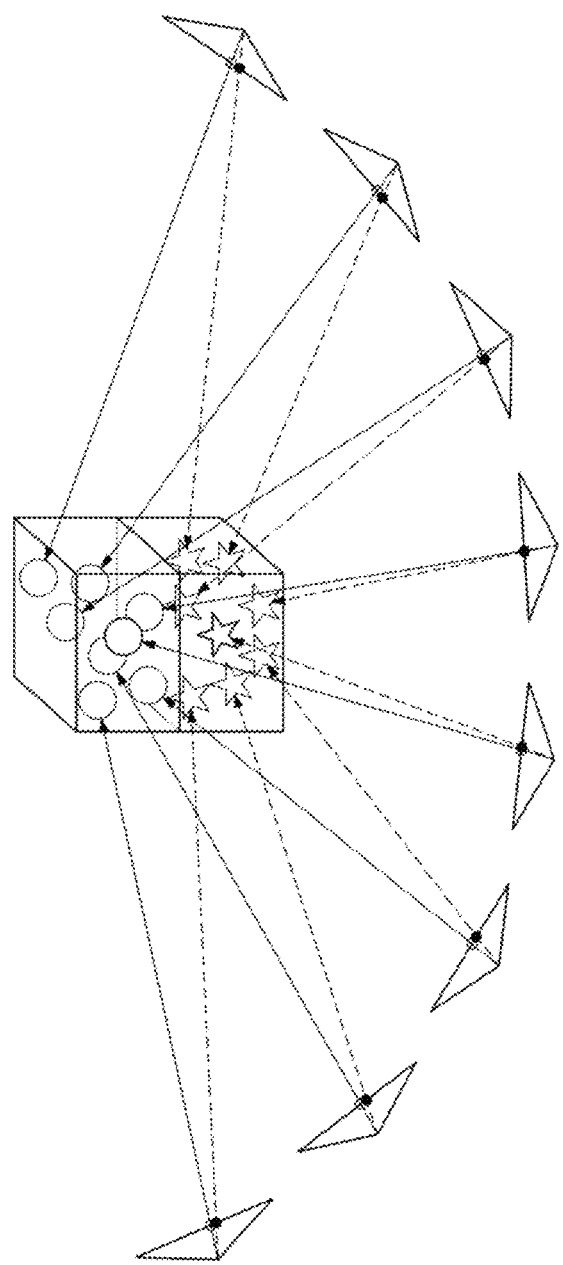
FIG. 7 is a view illustrating a method of generating a plenoptic point cloud according to an embodiment of the present disclosure.

FIG. 7 is a view illustrating a method of generating a plenoptic point cloud according to an embodiment of the present disclosure.

FIG. 7 shows an example of a method of generating a plenoptic point cloud through a simultaneous generation method of a point cloud. For example, the plenoptic point cloud according to the present disclosure may be derived through the simultaneous generation method of the point cloud.

The plenoptic point cloud may be generated using N two-dimensional (2D) images for each input time and depth information. At this time, the 3D space may be defined through a space including all the generated points.

At this time, the defined 3D space may be divided into predetermined unit voxels and points in a voxel may be merged to have one geometric information value. In addition, at this time, all color information of the 3D points may be stored and the plenoptic point cloud may be generated using information on from which view the point is generated.

Color information of a view in which a 3D point is not generated may be inferred from the color information of other views included in the same voxel. For example, the color information of the view in which the 3D point is not generated may be derived using at least one of an average value, a maximum value or a minimum value of the color information of other views or points in the voxel. In addition, for example, the color information of the view in which the 3D point is not generated may be derived from the color information of a view or point adjacent to a corresponding view or point.

Meanwhile, when multiple 3D points generated in one view are included in one voxel, a plenoptic point cloud may be generated by a method of storing at least one of the average value, the maximum value or the minimum value of the color values of the corresponding view.

As another example, when multiple 3D points generated in one view are included in one voxel, a plenoptic point cloud may be generated by a method of storing the color information of a point having smallest depth information or largest depth information.

Figure 8:
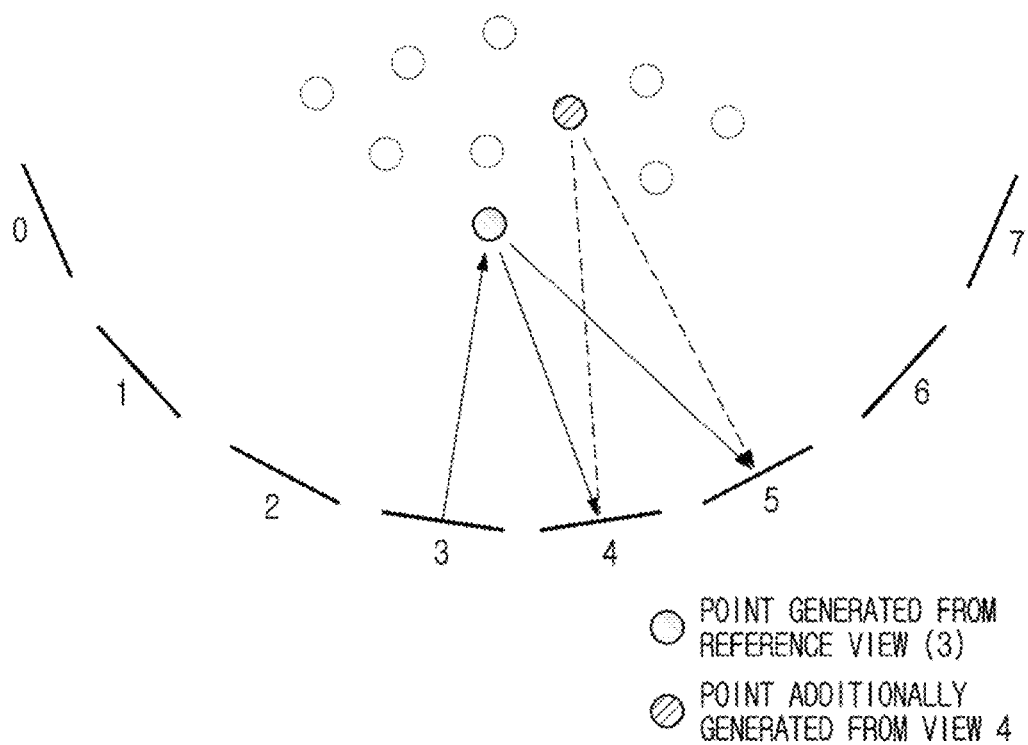
FIG. 8 is a view illustrating a method of generating a plenoptic point cloud according to an embodiment of the present disclosure.

FIG. 8 is a view illustrating a method of generating a plenoptic point cloud according to an embodiment of the present disclosure.

FIG. 8 shows an example of a method of generating a plenoptic point cloud through a sequential generation method of a point cloud. For example, the plenoptic point cloud according to the present disclosure may be derived through the sequential generation method of the point cloud.

According to the sequential generation method, a point cloud may be generated using a reference view image, a generated 3D point is projected onto a 2D image of a next view and then a plenoptic point may be generated using the color information of the projected coordinates.

At this time, the color information of the 3D point may be added through comparison between a difference between new color information and previously input color information or a difference between depth information obtained through projection and depth information of a corresponding point.

For example, previously input depth information of a 3D point and depth information at projected coordinates (or position) are compared, and, if a difference thereof is small, the color information of the coordinates (or position) projected onto the 3D point may be added. If the difference between the depth information is large, a new 3D point may be generated. At this time, whether the difference is large or small may be determined by comparing a difference between the previously input depth information of the 3D point and the depth information at the projected coordinates (or position) with a predetermined value.

In addition, for example, when the difference between the previously input color information of the 3D point and the color information at the coordinates (or position) onto which the corresponding point is projected is less than the predetermined value, the color information of the corresponding 3D point may be input.

At this time, for comparison of the color information, comparison of the above-described values may be performed with respect to color (H: Hue) information in which attribute information represented by RGB is converted into an HSV color space (format). As another example, for comparison of the color information, comparison of the above-described values may be performed with respect to a Y (luminance) component in which attribute information represented by RGB is converted into an a YUV format.

For example, as shown in FIG. 8, when View 3 is a reference view in multi-view images obtained from eight views, a 3D point generated from View-3 image may be projected onto next views and the color information of the projected coordinates may be stored as color information of each view. Meanwhile, in the example of FIG. 8, when a difference between the color information of a 3D point generated from a View-3 image, the color information at a position where the corresponding point is projected onto View 4 and the color information of View 4 is greater than a predetermined value, instead of storing the color information of the corresponding position (that is, the position where the corresponding point is projected onto View 4), a new point may be additionally generated, thereby generating a plenoptic point.

Next, a voxelization method of plenoptic point cloud data will be described in detail.

In order to efficiently represent plenoptic point cloud information, geometric information represented in the form of X, Y and Z in the 3D space needs to be represented in integer type rather than real number type. In order to represent geometric information in integer type, voxelization methods according to some embodiments of the present disclosure may be used. For example, the present disclosure proposes a method of performing voxelization using at least one of a voxelization method using a hexahedron or a voxelization method using a three-dimensional trapezoid.

First, the voxelization method using the hexahedron will be described. A hexahedron including a plenoptic point cloud generated using at least one of the simultaneous generation method or the sequential generation method of the point cloud may be defined.

At this time, a voxel for dividing the hexahedron in the same size may be defined and the size of each voxel on X, Y and Z axes may be defined as shown in Equation 1 below.

In the following description, MaxX, MaxY and MaxZ may mean the maximum values of the coordinates of the respective axes, and MinX, MinY and MinZ may mean the minimum values of the coordinates of the respective axes. Specifically, MaxX, MaxY and MaxZ may represent position information having maximum values among the coordinate values of the respective axes among the geometric information of the points existing in the 3D space, and MinX, MinY and MinZ may mean minimum values among the coordinate values of the respective axes among the geometric information of the points existing in the 3D space. voxel_dimension may mean the spatial resolution of the voxel. For example, when voxel_dimension is 4096, the hexahedron configuring the 3D space may be composed of 4096×4096×4096 voxels.

Size of voxel on $X$-axis: $(MaxX-MinX)$/voxel_dimension

Size of voxel on $Y$-axis: $(MaxY-MinY)$/voxel_dimension

Size of voxel on $Z$-axis: $(MaxZ-MinZ)$/voxel_dimension       [Equation 1]

The actual (representative) coordinates of the plenoptic point existing in the generated voxel may be calculated by a center position value of the voxel and a specific plenoptic point may be indicated using the index of the corresponding voxel.

Next, the voxelization method using the three-dimensional trapezoid will be described. A three-dimensional trapezoid including a plenoptic point cloud generated using at least one of the simultaneous generation method or the sequential generation method of the point cloud may be defined.

Figure 9:
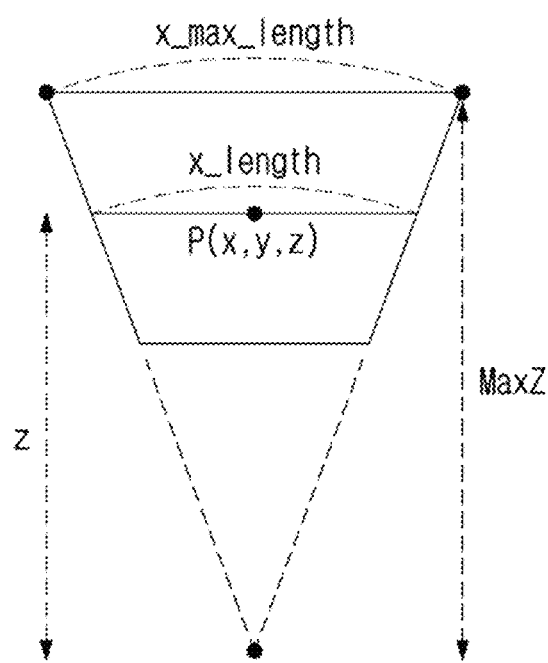
FIG. 9 is a view illustrating a voxelization method of plenoptic point cloud data according to an embodiment of the present disclosure.

FIG. 9 is a view illustrating a voxelization method of plenoptic point cloud data according to an embodiment of the present disclosure.

A smallest surface (near plane) of the three-dimensional trapezoid may be set to face a camera defined based on a user among the cameras which have obtained multi-view images. At this time, the indices of X, Y and Z may be defined as shown in FIG. 9. At this time, the lengths of the three-dimensional trapezoid on the X, Y and Z axes, the size of the voxel on the X, Y and Z axes and the indices on the X, Y and Z may be defined according to Equations 2 to 4 below, respectively.

x_length=x_max_length*z/maxZ y_length=y_max_length*z/maxZ z_length=maxZ−minZ       [Equation 2]

x_voxel_size=x_length/voxel_div_num y_voxel_size=y_length/voxel_div_num z_voxel_size=z_length/voxel_div_num       [Equation 3]

x_index=x−minX/voxel_div_num y_index=y−minY/voxel_div_num z_index=z−minZ/voxel_div_num       [Equation 4]

In Equations 2 to 4, x_max_length and y_max_length may mean the lengths of a largest surface (far plane) configuring the three-dimensional trapezoid in the X and Y axis directions (that is, the field of view (FOV) of the far plane in the horizontal direction and the FOV of the far plane in the vertical direction), maxZ may mean the length from the camera to the far plane in the Z axis direction, and minZ may mean the length from the camera to the near plane in the Z axis direction. x_length and y_length may mean the lengths in the X and Y directions of the surface including an arbitrary point (x, y, z) existing in the three-dimensional trapezoid. x_voxel_size, y_voxel_size and z_voxel_size may indicate the sizes of each voxel in the X, Y and Z axis directions, and x_index, y_index and z_index may indicate the indices in the X, Y and Z axis directions of the corresponding voxel. At this time, the index may be 0 or a natural number of 1 or more. voxel_div_num may mean the spatial resolution of the voxel and have the same meaning as voxel_dimension of Equation 1.

Next, a method of generating a multi-view image from a plenoptic point cloud will be described.

Figure 10:
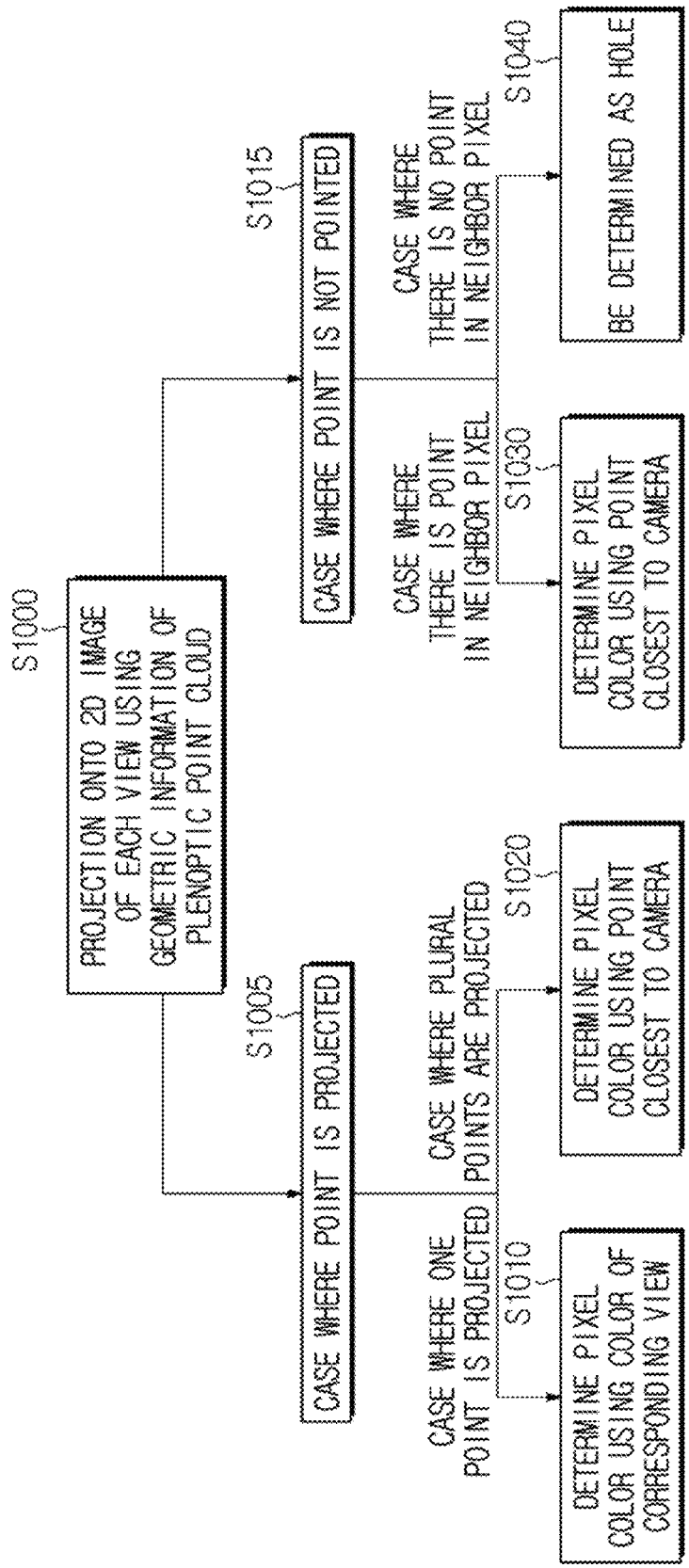
FIG. 10 is a view illustrating a method of generating a multi-view image according to an embodiment of the present disclosure.

FIG. 10 is a view illustrating a method of generating a multi-view image according to an embodiment of the present disclosure.

First, a 3D object may be projected onto a 2D image using the geometric information of a plenoptic point cloud (S1000). In addition, a 3D object (point) may be projected onto a 2D image using the occlusion pattern information of the plenoptic point cloud. For example, when the occlusion pattern information corresponding to an arbitrary view among the occlusion pattern information indicates meaningless color information, the corresponding point may not be projected onto the corresponding view. The occlusion pattern information may have "1" as a first value or have "0" as a second value. For example, when occlusion pattern information of an arbitrary view has a first value, the pixel value at the position projected onto the corresponding view may be determined as the color information of the corresponding view of the corresponding point. On the other hand, when occlusion pattern information has a second value, the point may not be projected onto the corresponding view.

At this time, when only one point is projected with respect to a current pixel, the color information of the current pixel may be determined using the color information of (the point of) the corresponding view (S1005, S1010). On the other hand, when a plurality of points is projected with respect to the current pixel, the color information of the corresponding pixel may be determined using the color information of (the point of) the view closest to the camera (S1005, S1020).

On the other hand, when the plenoptic point is not projected with respect to the current pixel, N neighbor pixels of the current pixel may be referenced. At this time, using the color information of the neighboring block closest to the camera, the color information of the current pixel may be determined (S1015, S1030). At this time, N may be a natural number greater than 0 and may have a value of 4 or 8, for example.

In addition, when the plenoptic point is not projected with respect to the current pixel and there is no color information or projected point in N neighbor pixels of the current pixel, hole filing may be performed with respect to the current sample using an interpolation method using an N×N mask on a 2D image (S1015, S1040). At this time, N may be a natural number greater than 0 and may have a value of 5, for example.

Figure 11:
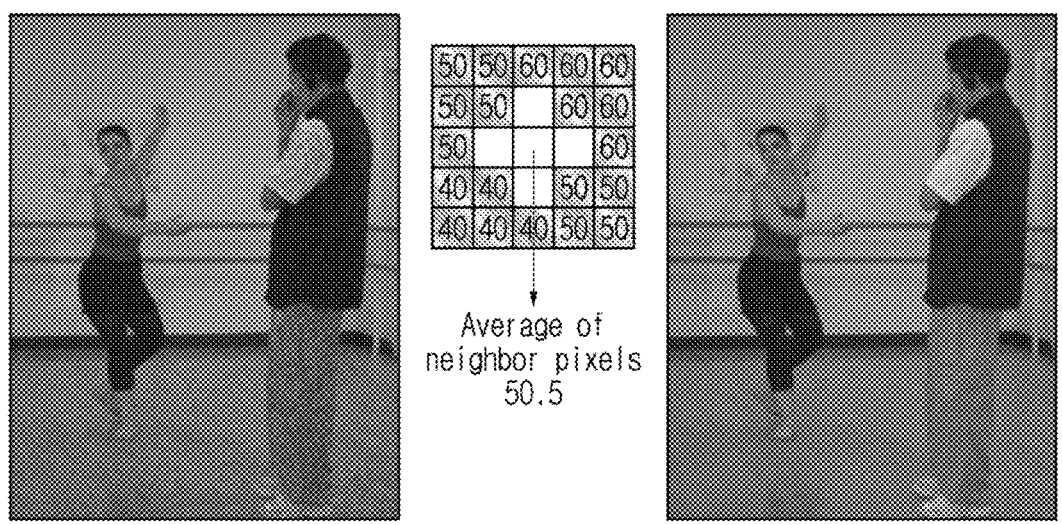
FIG. 11 is a view illustrating a hole filling method according to an embodiment of the present disclosure.

FIG. 11 is a view illustrating a hole filling method according to an embodiment of the present disclosure.

FIG. 11 shows a method of determining the color information of a center pixel in which point projection is not performed and there is no color information of four neighbor pixels. At this time, the center pixel may be derived using an average value of the color information of the pixels existing in a 5×5 region centered on the center pixel. The left photo of FIG. 11 shows an image in which a hole occurs and a right photo shows an image of a result of obtaining color information of the hole using hole filling.

Next, a method of analyzing similarity between plenoptic point clouds will be described.

In order to determine whether encoding of a 3D image is efficient, analysis of similarity between plenoptic point clouds may be performed. For similarity analysis, a 3D space in which a plenoptic point exists may be divided into a plurality of sub-blocks.

First, similarity of occlusion pattern information may be derived according to Equation 5 below.

$$x = 1 - \frac{\sum_{a}^{N}\sum_{b}^{N} H(a,b)}{{}_{N}C_{2} \times N_{c}}$$ [Equation 5]

At this time, x may mean similarity of occlusion pattern information, and N_c may mean the number of views existing in the plenoptic point cloud. H(a,b) may mean a hamming distance between plenoptic points a and b, and N may mean the number of plenoptic points in a 3D sub-block.

Next, color similarity of a plenoptic point existing in a sub-block may be derived according to Equations 6 to 9 below.

$$C(n)=[C_1(n),C_2(n),C_3(n),\ldots,C_{N_c}(n)]^T$$ [Equation 6]

C(n) of Equation 6 may mean a color component or color set of a plenoptic point.

$$\mu_c^i = \frac{1}{N}\sum_{n=1}^{N} C_i(n)$$ [Equation 7]

Equation 7 may be an operation for obtaining an average color value of a plenoptic point.

$$\Gamma(i,j) = \frac{1}{N-1}\sum_{n=1}^{N}(C_i(n) - \mu_c^i)(C_j(n) - \mu_c^j)$$ [Equation 8]

Equation 8 may be an operation for obtaining covariance of a plenoptic point.

$$\rho = \frac{\Gamma(i,j)}{\sqrt{\text{Var}(i) \times \text{Var}(j)}}$$ [Equation 9]

Equation 9 may be an operation for deriving a correlation coefficient between plenoptic points and Var may be an operation for deriving variance. Finally, through the result of Equation 9, similarity of the plenoptic point in one sub-block may be represented.

Figure 12:
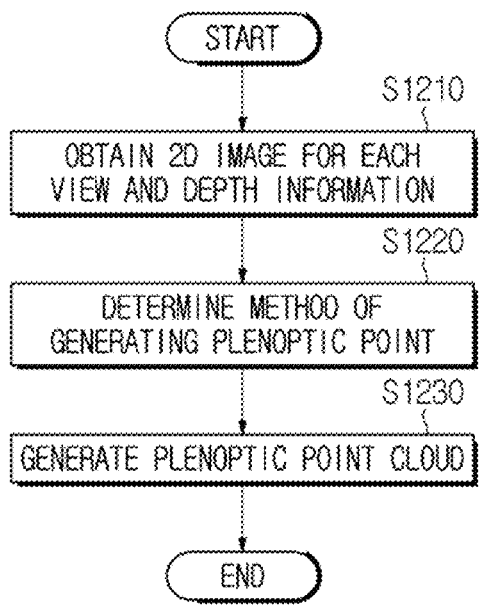
FIG. 12 is a flowchart illustrating a method of generating a plenoptic point cloud according to an embodiment of the present disclosure.

FIG. 12 is a flowchart illustrating a method of generating a plenoptic point cloud according to an embodiment of the present disclosure.

Referring to FIG. 12, the method of generating the plenoptic point cloud according to the embodiment of the present disclosure may include obtaining an 2D image for each view and depth information obtained from a plurality of cameras (S1210), determining a method of generating a plenoptic point cloud (S1220) and generating the plenoptic point cloud by applying the determined method of generating the plenoptic point cloud to at least one of the 2D image for each view or the depth information (S1230).

At this time, the method of generating the plenoptic point cloud may include at least one of the simultaneous generation method of the point cloud or the sequential generation method of the point cloud.

FIG. 13 is a view illustrating a method of generating a multi-view image according to an embodiment of the present disclosure.

Referring to FIG. 13, the method of generating the multi-view image according to the embodiment of the present disclosure may include obtaining geometric information of the plenoptic point cloud (S1310), obtaining a 2D image of each view using the geometric information of the plenoptic point cloud (S1320) and obtaining color information of a current pixel based on whether there is a plenoptic point projected onto the current pixel (S1330).

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some of the steps.

The various embodiments of the present disclosure are not a list of all possible combinations and are intended to describe representative aspects of the present disclosure, and the matters described in the various embodiments may be applied independently or in combination of two or more.

In addition, various embodiments of the present disclosure may be implemented in hardware, firmware, software, or a combination thereof. In the case of implementing the present invention by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

The scope of the disclosure includes software or machine-executable commands (e.g., an operating system, an application, firmware, a program, etc.) for enabling operations according to the methods of various embodiments to be executed on an apparatus or a computer, and a non-transitory computer-readable medium having such software or commands stored thereon and executable on the apparatus or the computer.

What is claimed is:

1. A method of generating a plenoptic point cloud, the method comprising:
    obtaining a two-dimensional (2D) image for each view and depth information obtained from a plurality of cameras;
    determining a method of generating a plenoptic point cloud among a plurality of methods of generating the plenoptic point cloud; and
    generating the plenoptic point cloud by applying the determined method of generating the plenoptic point cloud to at least one of the 2D image for each view or the depth information,
    wherein the plurality of methods of generating the plenoptic point cloud includes a simultaneous generation method of the point cloud and a sequential generation method of the point cloud,
    wherein, when the plenoptic point cloud is generated using the sequential generation method of the point cloud, a sequential generation method of the point cloud comprises:
    generating a first point cloud generated in a reference view;
    projecting the first point cloud onto a 2D image of a next view of the reference view; and
    generating a second point cloud using color information or depth information of coordinates onto which the first point cloud is projected.

2. The method of claim 1, wherein, when the plenoptic point cloud is generated using the simultaneous generation method of the point cloud,
    the generating of the plenoptic point cloud comprises:
    defining a three-dimensional (3D) space including all simultaneously generated point clouds; and
    dividing the defined 3D space into predetermined unit voxels.

3. The method of claim 2, wherein the generating of the plenoptic point cloud comprises merging points included in the voxel to have one geometric information.

4. The method of claim 2, wherein the generating of the plenoptic point cloud comprises generating the plenoptic point cloud using at least one of color information of points included in the voxel.

5. The method of claim 4, wherein color information of a view in which a point cloud is not generated is obtained using color information of other points in a voxel including a corresponding point cloud.

6. The method of claim 4, wherein, when a plurality of points generated in one view is included in one voxel, color information of the points generated in the view is derived using at least one of an average value, a maximum value or a minimum value of the color information of the view.

7. The method of claim 4, wherein, when a plurality of points generated in one view is included in one voxel, color information of the point cloud generated in the view is derived using depth information of point cloud points included in the voxel.

8. A method of generating a multi-view image using a plenoptic point cloud, the method comprising:
    obtaining geometric information of the plenoptic point cloud;
    obtaining a two-dimensional (2D) image of each view by projecting a plenoptic point using the geometric information of the plenoptic point cloud; and
    obtaining color information of a current pixel based on whether there is a plenoptic point projected onto the current pixel,
    wherein the plenoptic point cloud is generated by applying a determined method, among a plurality of methods of generating the plenoptic point cloud, to at least one of the 2D image for each view or depth information,
    wherein the plurality of methods of generating the plenoptic point cloud includes a simultaneous generation method and a sequential generation method,
    wherein, when the plenoptic point cloud is generated using the sequential generation method of the point cloud, a sequential generation method comprises:
    generating a first point cloud generated in a reference view;
    projecting the first point cloud onto a 2D image of a next view of the reference view; and
    generating a second point cloud using color information or depth information of coordinates onto which the first point cloud is projected.

9. The method of claim 8, wherein, when there is a plenoptic point projected onto the current pixel, the color information of the current pixel is obtained based on the number of plenoptic points projected onto the current pixel.

10. The method of claim 9, wherein, when one plenoptic point is projected onto the current pixel, the color information of the current pixel is obtained using color information of a plenoptic point of a view in which the projection is performed.

11. The method of claim 9, wherein, when a plurality of plenoptic points is projected onto the current pixel, the color information of the current pixel is obtained using color information of a plenoptic point of a view closest to a camera.

12. The method of claim 8, wherein, when there is no plenoptic points projected onto the current pixel, the color information of the current pixel is obtained using color information of a neighbor pixel of the current pixel.

13. The method of claim 12, wherein, when there is a plurality of neighbor pixels onto which the projection is performed, the color information of the current pixel is obtained using color information of a neighbor pixel closest to a camera.

14. The method of claim 12, wherein, when the plenoptic point is not projected onto all neighbor pixels of the current pixel, the color information of the current pixel is obtained using a hole filling method.

15. The method of claim 14, wherein the hole filling method is performed using an interpolation method of applying an N×N mask based on the current pixel.

16. The method of claim 8, wherein, when a plenoptic point is projected onto at least one neighbor pixel of the current pixel, the color information of the current pixel is obtained using color information of the at least one neighbor pixel.

17. A non-transitory computer-readable recording medium storing a bitstream including plenoptic point cloud information,
    wherein the bitstream includes the plenoptic point cloud information of a plurality of views,
    wherein the plenoptic point cloud information includes geometric information, color information and occlusion pattern information of a plenoptic point cloud,
    wherein, when the occlusion pattern information indicates a first value, the occlusion pattern information indicates that the color information of a plenoptic point is meaningful color information and the plenoptic point is projected onto a pixel, and
    wherein, when the occlusion pattern information indicates a second value, the occlusion pattern information indicates that the color information of a plenoptic point is meaningless color information and the plenoptic point is not projected onto the pixel, wherein the plenoptic point cloud is generated by applying a determined method, among a plurality of methods of generating the plenoptic point cloud, to at least one of a 2D image for each view or depth information, wherein the plurality of methods of generating the plenoptic point cloud includes a simultaneous generation method and a sequential generation method, wherein, when the plenoptic point cloud is generated using the sequential generation method of the point cloud, a sequential generation method comprises:

generating a first point cloud generated in a reference view;

projecting the first point cloud onto a 2D image of a next view of the reference view; and generating a second point cloud using color information or depth information of coordinates onto which the first point cloud is projected.

18. The non-transitory computer-readable recording medium of claim 17, wherein the plenoptic point cloud information includes one geometric information, representative color information of the plurality of views and color information of the plurality of views.

19. The non-transitory computer-readable recording medium of claim 17, wherein the plenoptic point cloud information includes one geometric information, representative color information of the plurality of views and occlusion pattern information of the plurality of views.

* * * * *